March 28, 1950   S. G. HARRIS ET AL   2,502,091
APPARATUS FOR PREPARING CRABS
Filed March 7, 1946   5 Sheets-Sheet 3
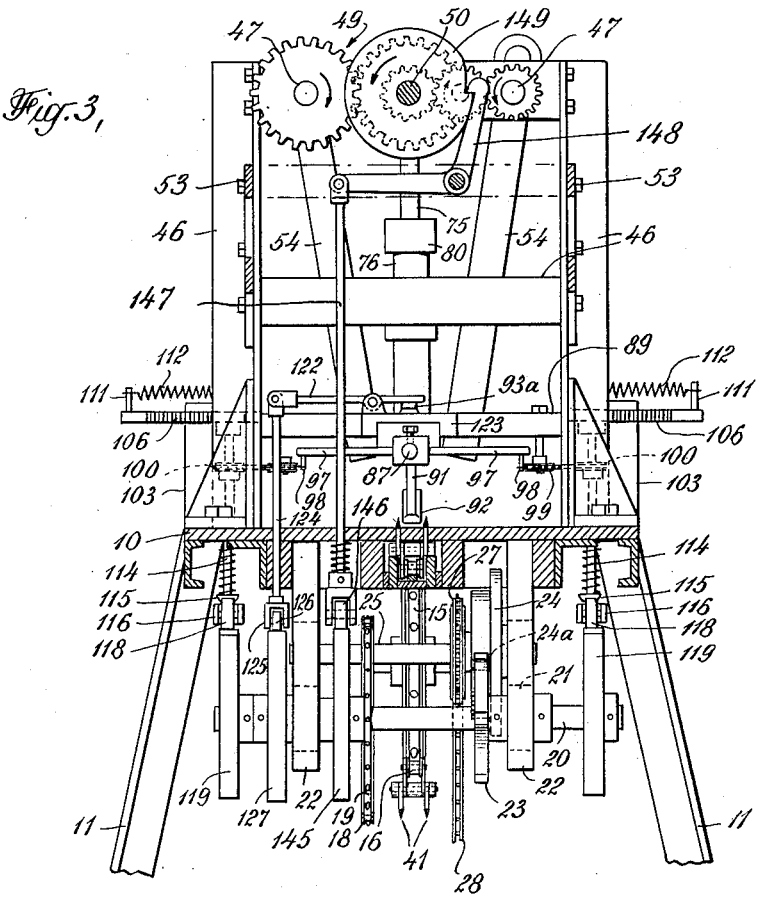
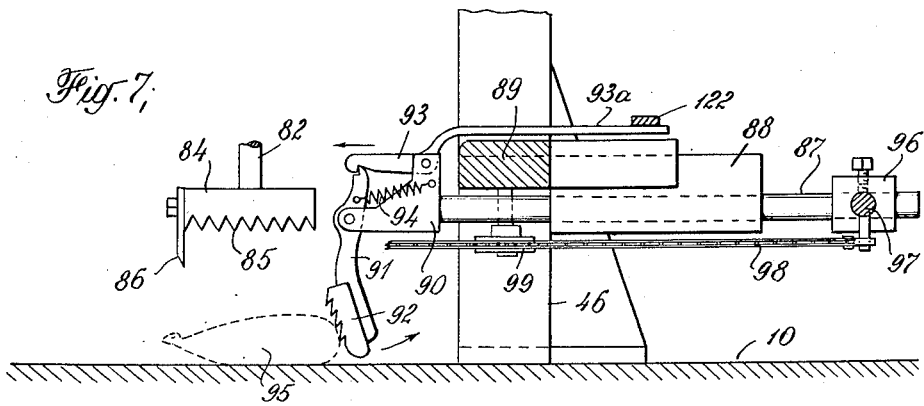
INVENTORS
Sterling G. Harris
Sumner C. Welles
BY
Pennie Edmonds Morton Barrows
ATTORNEYS

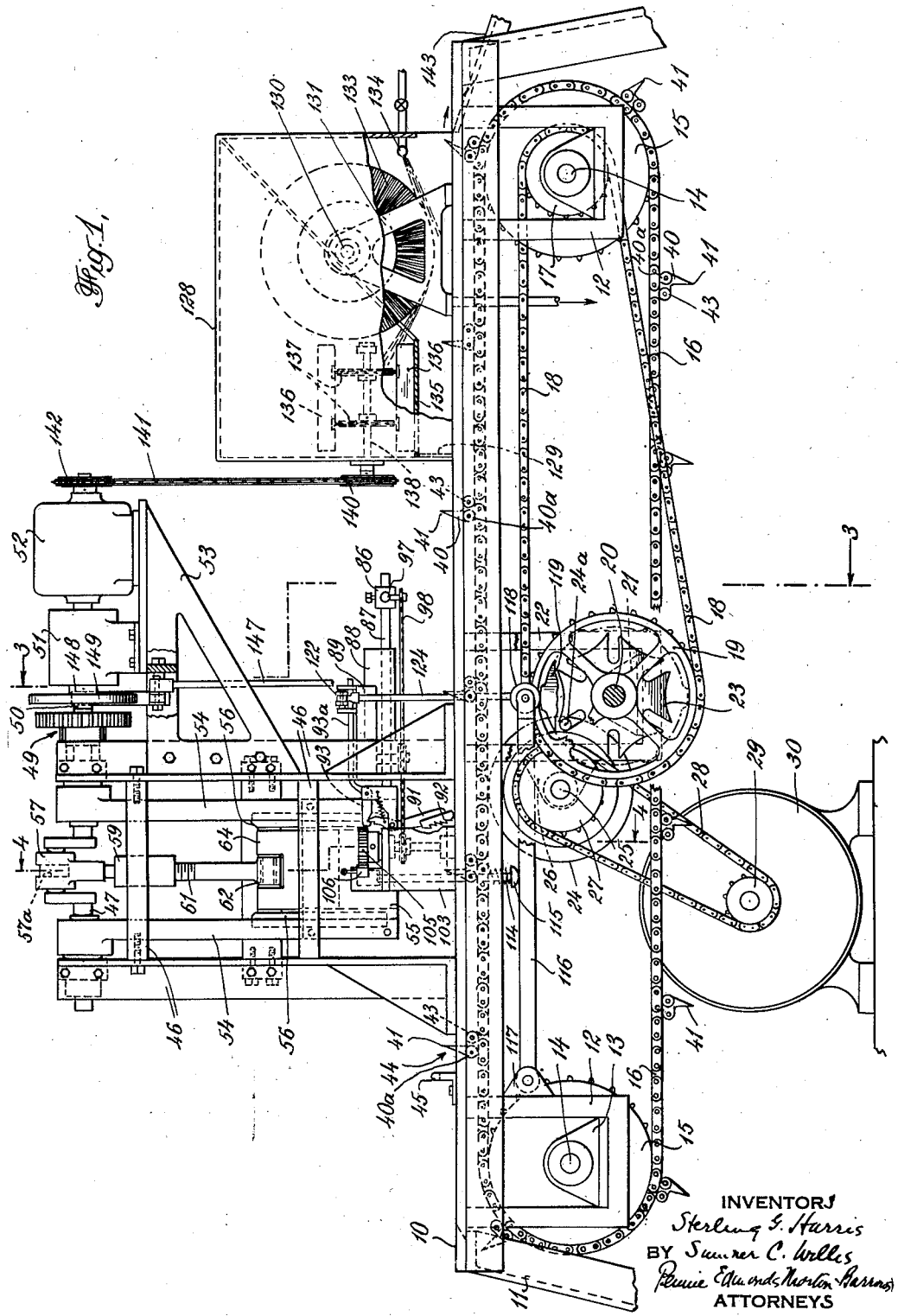

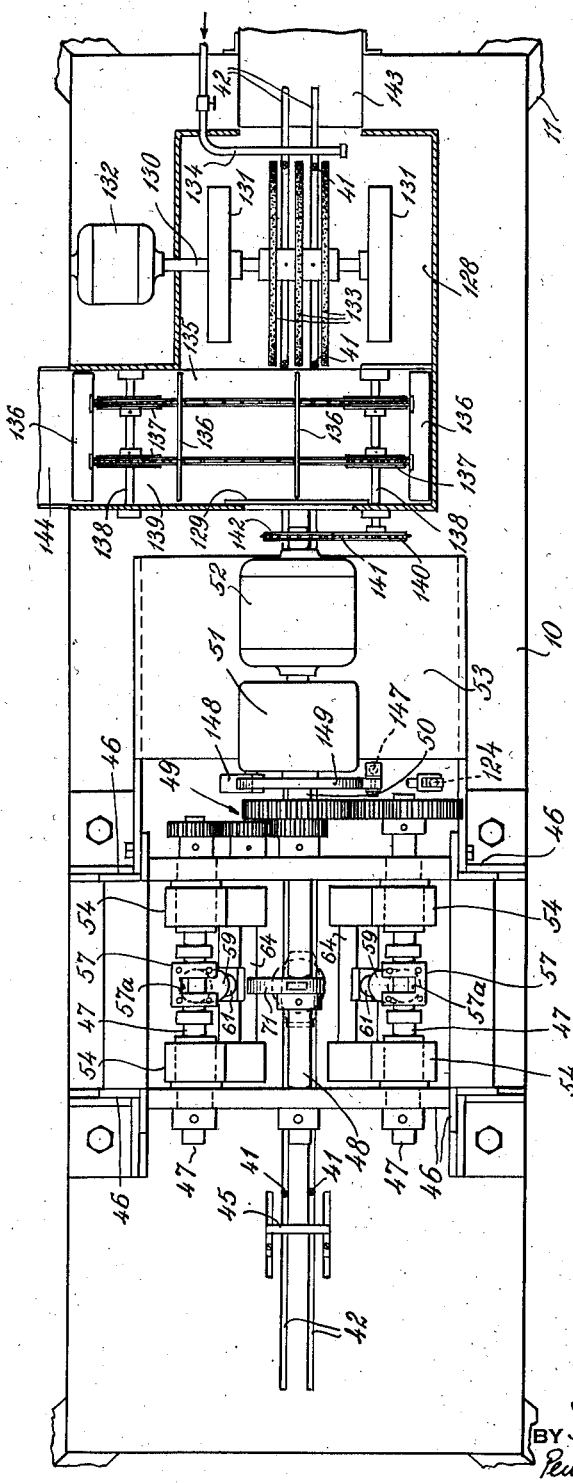

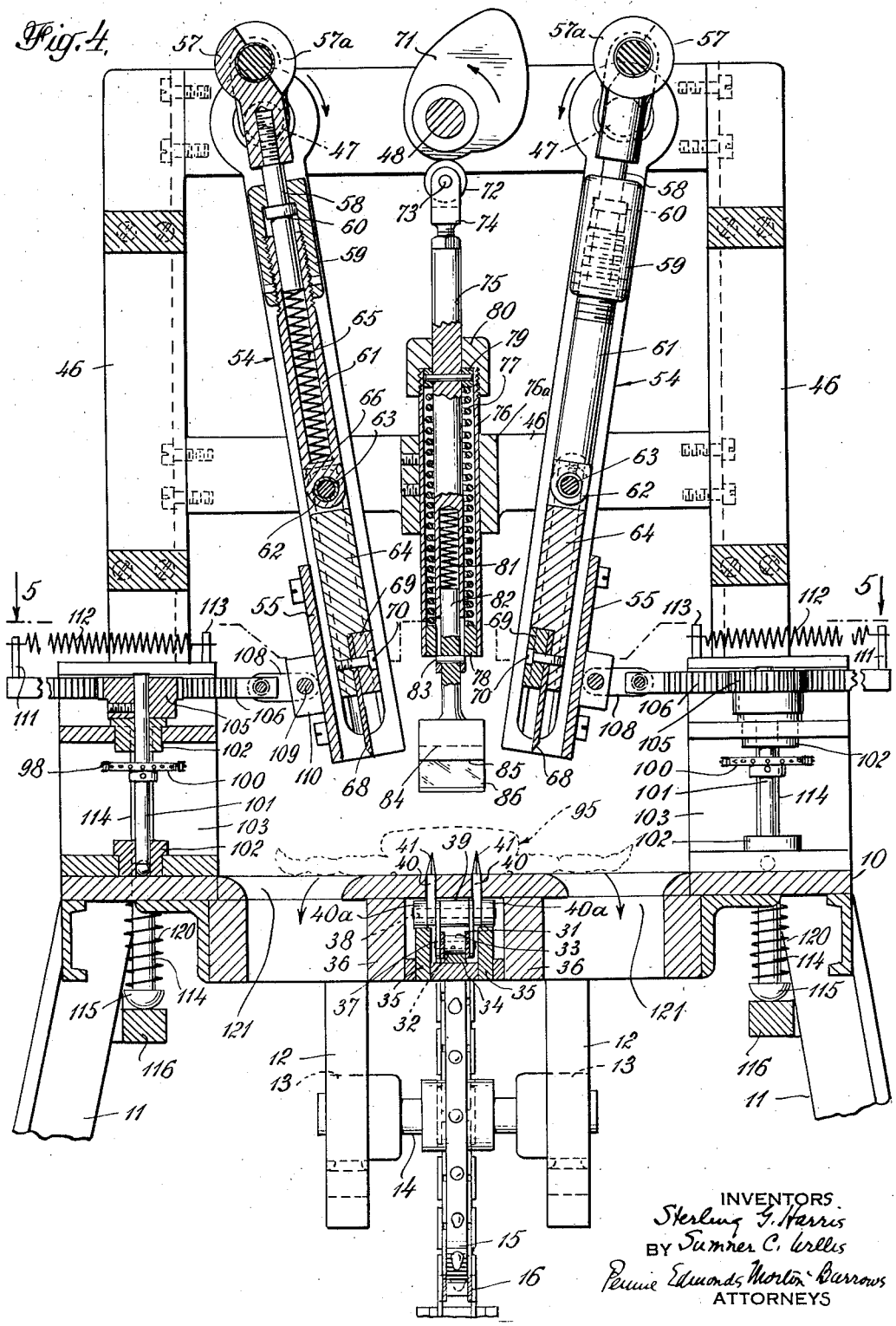

March 28, 1950 S. G. HARRIS ET AL 2,502,091
APPARATUS FOR PREPARING CRABS
Filed March 7, 1946 5 Sheets-Sheet 5
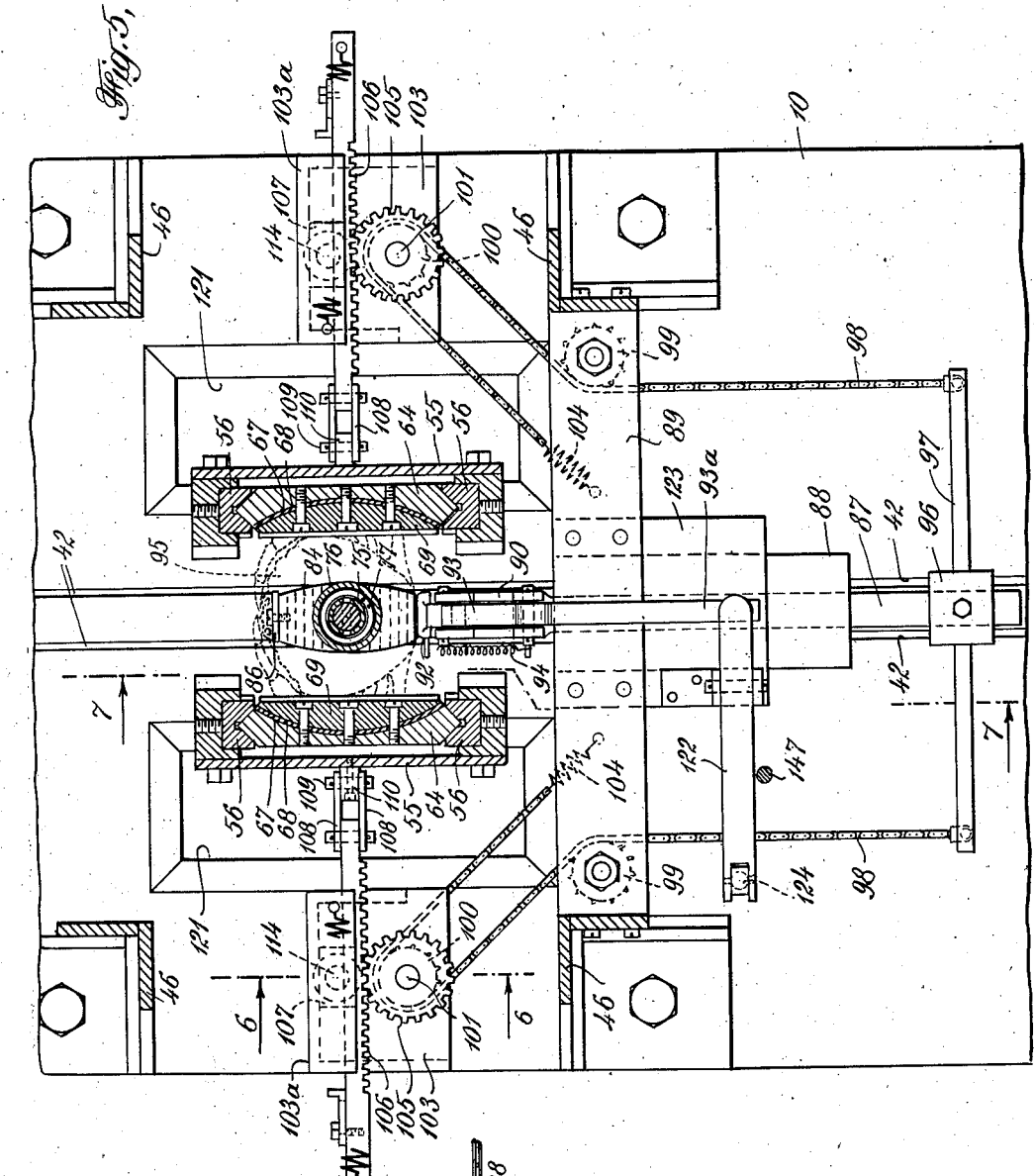
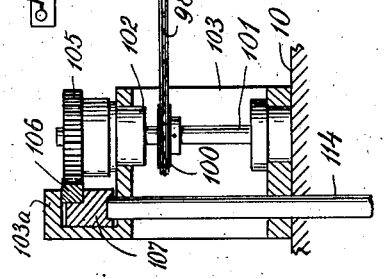
INVENTORS
Sterling G. Harris
Sumner C. Wells
BY
Pennie Edmonds Morton Barrows
ATTORNEYS

Patented Mar. 28, 1950

2,502,091

UNITED STATES PATENT OFFICE 2,502,091

APPARATUS FOR PREPARING CRABS

Sterling G. Harris, Beaufort, S. C., and Sumner C. Willis, White Plains, N. Y., assignors to The Blue Channel Corporation, Port Royal, S. C., a corporation of Maryland Application March 7, 1946, Serial No. 652,765

15 Claims. (Cl. 17—2)

This invention relates to apparatus for treating crabs to facilitate the removal of the meat therefrom for canning purposes and is concerned more particularly with a novel apparatus by which crabs can be rapidly and efficiently trimmed by severance of the legs and claws thereof inward slightly from the knuckles. The new machine may be constructed to perform the additional operations of breaking portions of the carapaces of the crabs and also removing the broken pieces of shell and the inedible contents of the body cavities below the carapace of the crab. The use of the machine thus eliminates much manual labor and reduces the cost of the final product.

Although not limited in its utility to the treatment of crabs of any particular type, the new apparatus may be employed to particular advantage in the trimming of the common edible crabs of the Atlantic coast of the United States, which are the so-called "blue," "rock," and "sand" crabs. The meat of these crabs is extremely perishable in that it rapidly becomes discolored to the point where it is unmarketable. It is, therefore, of the utmost importance that the operations incident to the canning of such crab meat be carried on with great speed. The recovery of the meat from crabs is a difficult operation because of their complicated physiological structure and, heretofore, the work has been done manually by pickers. As the output of a highly trained picker is only about 50 pounds of meat per day and the average output is around 30 pounds, it is evident that the labor charge for picking is an important element in the cost of production.

In the manual handling of crabs to obtain the meat in a form suitable for canning, the crabs are given a preliminary heat treatment and, when they are sufficiently cool, the carapace of each crab is removed and the gills and viscera are then removed from the body cavities beneath the carapace. The picker next severs the legs and claws immediately above the knuckles by means of a knife and this operation also severs the tendons which lead from the mucles of the body into the legs and claws. As the source of discoloration of the meat lies mainly in the inedible portions of the crab, it will be apparent that an increase in the rate at which the operations of cleaning the inedible materials from the body cavities of the crabs and trimming off the claws and legs are performed will reduce the spoilage.

The present invention is, accordingly, directed to the provision of an apparatus by which the legs and claws of crabs can be trimmed off and the tendons severed, the machine being simple in construction and operation so that it can be run by unskilled labor. In its preferred form, the machine performs the additional operations of removing the carapace and cleaning the inedible material out of the body cavities, so that, by its use, all operations preliminary to the actual removal of the meat can be performed automatically, except for the feeding of the crabs to the machine. As the machine operates at a high output rate, it reduces both labor costs and spoilage losses.

For a better understanding of the invention, reference may be made to the accompanying drawings, in which Fig. 1 is in side elevation, with parts broken away, of one form of the new apparatus;

Fig. 2 is a plan view of the apparatus with parts removed and broken away;

Figs. 3 and 4 are sectional views on the lines 3—3 and 4—4, respectively, of Fig. 1;

Fig. 5 is a sectional view on the line 5—5 of Fig. 4; and

Figs. 6 and 7 are sectional views on the lines 6—6 and 7—7, respectively, of Fig. 5.

The machine in the form illustrated in the drawings includes a bed 10 supported on suitable legs 11 and having a pair of frames 12 attached to its under surface near each end. The frames carry bearings 13 for the shafts 14 and the shafts are provided with sprocket wheels 15 connected by a chain 16. One of the shafts 14 carries a second sprocket wheel 17 and a drive chain 18 is trained about sprocket wheel 17 and about a sprocket wheel 19 on a drive shaft 20 mounted in bearings 21 in a pair of frames 22 attached to the under surface of the bed 10 about midway between its ends. The slotted disc 23 of a Geneva mechanism is mounted fast on shaft 20 and it is driven by a pin 24a on a disc 24 fast on a shaft 25 mounted in bearing members 26 carried in brackets attached to frames 22. Shaft 25 carries a sprocket wheel 27 which is connected by a drive chain 28 to a sprocket wheel 29 on the shaft of a motor 30 mounted beneath the bed 10 in any convenient location.

The chain 16 (Fig. 4) is made up of two sets of flat links 31 connected by pins 32, on which are mounted rollers 33, and the upper stretch of the chain is supported beneath the bed 10 on a track 34 along which the rollers 33 travel. The track member is supported between a pair of guides 35 which are carried between the longitudinal members 36 attached to the under side of the bed. At spaced intervals along chain 16, the chain is provided with pairs of links 37 mounted on opposite ends of a pin 32 of the chain. The outer ends of each pair of links 37 are connected by a pin 38 which passes through a roller 39 lying between the links. Each pin 38 projects outwardly beyond its links 37 and on the projecting ends of each pin are mounted L-shaped plates 40 and rollers 40a. Each plate 40 has a leg which terminates in a spear 41 and and the spears extend through parallel slots 42 (Fig. 2) formed through bed 10. The other leg of each plate 40 extends parallel to chain 16 and carries a roller 43 (Fig. 1). The rollers 40a, 43 travel along the tops of the guide members 35 to maintain the plates 40 in the upper stretch of chain 16 with their spears projecting vertically through slots 42.

When the machine is in operation, the motor drives shaft 25 continuously and once per revolution of disc 24, its pin 24a enters a slot in the disc 23 and causes the disc and shaft 20 to be rotated through part of a revolution, after which the disc and shaft come to rest, until the pin 24a enters the next slot in the disc. The shaft 14 is thus driven intermittently and chain 16 is advanced with a step-by-step motion across the bed 10 from left to right as shown in Fig. 1. At the point 44, the chain comes to rest with a pair of spears 41 projecting above the top of the table and immediately to the left of this place, a frame 45 is mounted on top of the table to straddle the chain. During each period of rest, the operator impales a crab upon spears 41 adjacent frame 45 with the front end of the crab against the adjacent face of the frame. The crab is then held securely in place on the chain to be carried along the bed thereby.

At the position of rest of the chain next beyond frame 45, the crab is brought to a trimming station. At this station, a framework comprising standards and suitable connecting members 46 is mounted on top of the table to straddle the path of the chain 16. A pair of crank shafts 47 with a cam shaft 48 lying between them are mounted in suitable bearings in the frame work and extend parallel to the direction of travel of the crabs. The shafts are driven through gearing generally designated 49 from a drive shaft 50, which is connected through a one revolution clutch 51 to the shaft of a motor 52, the clutch and motor being mounted on brackets 53 attached to standards of the framework. The motor 52 operates continuously and, when the clutch is tripped by means to be described, the drive shaft 50 is clutched to the motor shaft and rotated through one revolution, after which the clutch disconnects the shafts. The gearing is so constructed that, for each revolution of shaft 50, the crank shafts and the cam shaft make one revolution.

A pair of arms 54 are mounted for swinging movement on each crank shaft adjacent its ends, and the lower ends of the arms of each pair are connected by a plate 55 and have channels in their opposed faces, in which are mounted guides 56. A connecting rod 57 is mounted on the crank of each shaft 47 and this rod has a bore in its lower end into which is threaded one end of a plunger 58. The plunger extends into a sleeve 59 and carries a collar 60 which lies within an enlarged section of the bore of the sleeve. A tube 61 is threaded into the lower end of the bore of sleeve 59 and the tube is provided at its lower end with a head 62 encircling a pin 63 mounted between spaced end portions of a block 64, the beveled lateral edges of which are received within guideways of similar shape in guides 56. A spring 65 within the tubular member 61 bears at its upper end against the end of plunger 58 and its lower end engages a partition 66 closing the end of the tube 61 adjacent its head 62.

The inner face of the lower end of each block 64 is cut away to form a concave seat 67 (Fig. 5) and a curved knife 68 is held against the seat by a block 69 having a convex face engaging the concave face of the knife. The block 69 is held in place by bolts 70 passing through the block and knife and threaded into block 64.

The cam shaft 48 carries a cam 71, against the surface of which bears a roller 72 on a shaft 73 mounted between the legs of a bearing block 74, which is adjustably connected to a rod 75. The rod extends through a tube 76 rigidly mounted in a collar 76a attached to one of the horizontal members 46 of the framework. Tube 76 is of substantially greater diameter than the rod 75 and a spring 77 is mounted within the tube to encircle the rod. The lower end of the spring bears against a hollow plug 78 mounted in the lower end of the tube 76 and, at its upper end, the spring bears against a collar 79 pinned to the rod 75. A cap 80 is threaded on the upper end of the tube 76 and has an opening through which rod 75 extends. The spring urges the rod 75 upward to hold roller 72 in contact with the edge of cam 71 and the upward movement of rod 75 is limited by engagement of the collar 79 thereon with the inner face of cap 80.

The lower end of the rod 75 is hollow and contains a spring 81, which is seated at its upper end against the end wall of the cavity in rod 75 and bears at its lower end against the end of a plunger 82 which extends into the cavity. The plunger is held in place by a pin 83, the ends of which enter diametrical slots formed through the walls of the hollow portion of rod 75. At its lower end, the plunger carries a block 84, the under surface of which is formed with a number of projections 85. A knife blade 86 is mounted on the front face of block 84 to extend transversely of the direction of movement of chain 16, the knife projecting downwardly a considerable distance below the projections.

When a crab being advanced by chain 16 comes to rest at the trimming station, the crank shafts 47 operate to move slides 64 downwardly to cause the knives 68 to cut off the legs and claws from the opposite sides of the crab. It is desirable that the legs and claws be cut just inward from the knuckles, and, since the crabs vary in size, means are provided to adjust the spacing of the knives in accordance with the size of the crab about to be cut. It has been found that the proper spacing of the knives varies approximately proportionally with the length of the crab, and the gauging mechanism, which adjusts the relation of the knives, is actuated by the crab itself as it approaches the trimming station.

The gauging mechanism includes a rod 87 mounted for endwise movement in a sleeve 88 secured to a frame member 89 which is attached to the framework and extends across bed 10 above the latter. At its front end, the rod 87 carries a block 90 (Fig. 7), on which a lever 91 is pivoted to swing in a vertical plane lengthwise of the bed. The lever carries a toothed block 92 at its lower end and its upper end is engageable in a notch in a latch lever 93 pivoted on block 90 to swing in a vertical plane. A spring 94 attached to block 90 and to the upper end of lever 91 tends to move the lever to free its end from the notch in the latch lever. As a crab, indicated at 95, advances toward the cutting station, it engages the block 92 just before the crab comes to rest and tends to swing lever 91 counter-clockwise. Since, at this time, the upper end of the lever is engaged in the notch in latch lever 93, the engagement of the crab with lever 91 causes the lever and rod 87 to be pushed along with the crab.

The rear end of rod 87 carries a collar 96 to which a cross rod 97 is attached. Each end of rod 97 is connected to a chain 98 which extends about an idler sprocket wheel 99 on the frame member 89 and then passes about a sprocket wheel 100 on a shaft 101 supported for rotation in suitable bearings 102 in standards 103 mounted on the bed 10. Beyond the sprocket wheel, each chain is attached to one end of a spring 104 having its other end secured to the frame member 89. Each of the shafts 101 carries a gear 105 at its upper end, which meshes with a rack 106 mounted in a guide member 107 (Fig. 6) loosely supported between portions of a standard 103. Each rack is connected at one end by links 108 to a pin 109 supported in a plate 110 secured to the outer face of one of the plates 55 connecting the lower ends of a pair of arms 54. Each rack is also provided with a pin 111 connected by a spring 112 to a pin 113 secured to the standard 103 in which the rack is mounted.

With the arrangement described, the rearward movement of lever 91 and rod 87 causes chains 98 to be pulled and this results in the rotation of sprocket wheels 100 and shafts 101. The shafts operate through their gears 105 to move the racks away from one another and this causes the pairs of arms 54 to swing apart. The positions at which the arms come to rest determines the spacing of the knives 68 and the knives are thus separated in accordance with the length of the crab.

When the knives 68 perform their cutting action, it is important that the arms 54 be held firmly in place and this is accomplished by means of locking rods 114 which extend upwardly through openings through the bed 10 and standards 103 and enter openings in the bottoms of the rack guides 107. Each locking rod has a head 115 on its lower end which rests upon a lever 116 pivoted at one end in a bracket 117 attached to one of the frame members 12. At its free end, each arm 116 carries a roller 118 which bears upon the surface of a cam 119 on shaft 20. The cam has a number of projections and is so formed that, as chain 16 comes to rest with a crab at the trimming station, the levers 116 are raised and raise their locking rods 114. The rods in turn clamp their respective rack guides 107 against overhanging portions 103a of the standards in which the guides are mounted. When the shaft 20 next begins to rotate, the cam permits rods 116 to drop and release the locking rods. In order to hold the locking rods against their levers, each rod is encircled by a spring 120 which bears against the under surface of the bed and against the head 115 on the rod.

In the downward movement of the knife blocks 64 with their knives 68, the connecting rods 58 act through the springs 65 to move the block 64 and the springs cushion the shocks to the mechanism, which arise from the knives cutting through the crabs and striking the top of the bed. When the cuts have been effected, the severed legs and claws drop down through openings 121 through the bed and are collected in suitable receptacles.

When the cutting has been completed, the knives are raised from the crab, but, just before this occurs, cam 71 causes rod 75 to move downwardly, so that the projections 85 on the lower face of block 84 strike and crush the carapace of the crab. At the same time, knife 86 trims off the edge of the shell of the crab from which the eyes protrude. The shock to the mechanism resulting from this action is cushioned by spring 81, through which rod 75 acts on plunger 82. As the block 84 engages the crab just before the knives 68 rise therefrom, the crab is thereby prevented from being freed from spears 41 by its adherence to knives 68. The cam 71 is of such shape and size, that, in its rotation, it would interfere with the connecting rods 57 on the crank shafts. The heads of these rods are, accordingly, slotted as indicated at 57a to avoid such interference.

When the operations performed on the crab at the trimming station have been completed and the knives 68 and block 84 have been raised clear of the crab, the crab is advanced another step with the chain. In order that the crab may pass by the block 92 on the end of lever 91, the lever is freed to permit it to swing so that the block will ride over the top of the crab. For this purpose, the latch lever 93 is provided with a tail 93a which is engageable by a tripping lever 122 pivotally mounted on an extension 123 from frame member 89. Lever 122 is connected at one end to a rod 124, which is mounted for vertical movement in a block attached to the under surface of bed 10 and is provided at its lower end with a bearing block 125 in which is mounted the shaft of a roller 126 resting on the surface of a cam 127 on shaft 20. Whenever shaft 20 starts to move, the cam causes rod 124 to rise and swing lever 122 to depress the tail 93a of lever 93 and release lever 93 from lever 91. Lever 91 may then be swung to permit the crab to pass by block 92. When the crab has moved beyond the block, the latch lever 93 is released and spring 94 swings lever 91 back to its original position with its end engaged in the notch in the latch lever.

From the trimming station, the carcass of the crab is moved along the bed 10 with chain 16, until it enters a chamber 128 mounted above the bed across the path of travel of the chain. The chamber has a swinging door 129, through which the crab may enter the chamber, the door swinging shut after the crab has passed through it.

A shaft 130 is mounted in bearing blocks 131 resting on the bed within the chamber, and the shaft projects out of the chamber and is driven in any convenient way, as by motor 132. A plurality of stiff brushes 133 are mounted on the shaft within the chamber and these brushes act on a crab, during its movement with the chain, to remove the broken pieces of shell and the inedible material in the body cavities beneath the carapace. The cleaning out of the body cavities is facilitated by jets of water from a nozzle pipe 134 extending across the chamber beyond the brushes and supplied with water under pressure.

The material removed from the crab by the brushes is thrown upon a transverse platform 135 mounted within the support above the bed and at the front wall of the support. The material deposited on the platform is removed by plates 136 on a double conveyor chain which passes about sprocket wheels 137 on shafts 138 mounted in suitable bearings. One of the shafts is disposed within the chamber and carries a sprocket wheel 140 connected by a chain 141 to a sprocket wheel 142 on the shaft of motor 52. The other shaft lies in an outlet 139 from the chamber.

The brush shaft is mounted in such position within the chamber that the brushes act on the crabs during their movement with the chain. When the crabs have passed beyond the brushes, they are carried out through an opening in the rear wall of the chamber. As the chain 16 curves downwardly around adjacent sprocket wheel 15, the spears 41 on which the crab was impaled are withdrawn therefrom and the crab slides down an inclined surface 143 to a suitable receptacle or conveyor. The refuse material carried away from the platform 135 by the conveying device passes down an inclined surface 144 at one side of the bed into a receptacle.

In the operation of the apparatus, the crabs, which have been given a preliminary heat treatment, are impaled by the operator upon the successive pairs of spears 44, as the latter come to rest adjacent the frame 45. Upon the next step in the advance of the chain, the crabs are brought successively to the trimming station and, as each crab approaches its position of rest at that station, it causes the knives 68 to be adjusted in accordance with its size. The knives are then held in place by the clamping of the racks 106 and, just as these actions are completed, a cam 145 on shaft 20 acts through roller 146 mounted on the lower end of a vertical rod 147 passing through bed 10 and rocks a bell crank lever 148 pivoted on a suitable part of the framework at the trimming station. The end of one arm of the bell crank is then released from a notch in the edge of a disc 149 forming part of the tripping means of the single revolution clutch 51 and the clutch operates to connect shaft 50 to the shaft of motor 52. The knives are then moved down to cut off the legs and claws of the crab and the plunger breaks the carapace and trims off the front edge of the shell. The trimmed crab is then advanced in successive steps until it enters the cleaning chamber, where it comes to rest just short of the brushes. In the next movement of the crab, it passes beneath the brushes and the pieces of shell and inedible material are rapidly brushed away and the shell cavities cleaned out. The trimmed and cleaned carcass is then discharged at the rear end of the machine.

What we claim:

1. In a machine for treating crabs, the combination of means for supporting a crab and holding it in fixed position, means for cutting the legs and claws from opposite sides of the crab, and means engaged by a crab in said position and operable to vary the action of the cutting means.

2. In a machine for treating crabs, the combination of means for supporting a crab and holding it in fixed position, cutters for cutting the legs and claws from opposite sides of the crab, means for actuating the cutters, and means engaged by a crab in said position and operable to vary the relative positions of the cutters.

3. In a machine for treating crabs, the combination of means for supporting a crab and holding it in fixed position, cutters for cutting the legs and claws from opposite sides of the crab, the cutters being movable toward and away from each other, means for actuating cutters, and means engaged by a crab in said position and operable to move the cutters toward and away from each other in accordance with the size of the crab.

4. In a machine for treating crabs, the combination of means for supporting a crab and holding it in fixed position, cutters for cutting the legs and claws from opposite sides of the crab, guides for the cutters, means for reciprocating the cutters in the guides, and means engaged by a crab in said position and operable to move the guides toward and away from each other in accordance with the size of the crab.

5. In a machine for treating crabs, the combination of means for supporting a crab and holding it in fixed position, means mounted above a crab in said position and operable to cut the legs and claws from opposite sides of the crab, and means engaged by a crab in said position and operable to vary the action of the cutting means in accordance with the size of the crab.

6. In a machine for treating crabs, the combination of means for advancing a crab stepwise, cutters mounted above the advancing means and operable to cut the legs and claws from opposite sides of the crab, means for breaking the carapace of the crab, and power-driven means for operating the cutters and breaking means in timed relation such that the cutters act on a crab at rest and the breaking means operate just after the cutters.

7. In a machine for treating crabs, the combination of means for supporting a crab and holding it in fixed position, cutters reciprocable toward and away from a crab in said position and operable to cut the legs and claws from opposite sides of the crab in their movement toward the crab, the cutters being movable toward and away from each other, reciprocable means operable to engage the crab and prevent its removal from the holding means, means engaged by a crab in said position and operable thereby to vary the relative positions of the cutters, and power-driven means for operating the cutters and reciprocable means in timed relation such that the reciprocable means engage the crab just before the cutters move away from the crab.

8. In a machine for treating crabs, the combination of means for advancing a crab in steps with pauses between the steps, means operating on the crab during one of the pauses to cut the legs and claws therefrom and break the carapace thereof, and means operating on the trimmed crab to remove the broken pieces of shell and the contents of the shell beneath the portion removed.

9. In a machine for treating crabs, the combination of means for advancing crabs with an intermittent movement, reciprocating means operating during the periods of rest of such movement to cut the legs and claws from opposite sides of the crabs, and means operating to engage the crabs immediately after the legs and claws have been cut therefrom to engage the crabs to prevent their movement with the cutting means and to break the carapaces of the crabs.

10. In a machine for treating crabs, the combination of a bed, means for advancing crabs along the bed with an intermittent movement, means operating during periods of rest of such movement to cut the legs and claws from opposite sides of the crabs and to break the carapaces thereof, and means operating on the trimmed crabs during their movement to remove the broken pieces of shell and the contents of the cavities in the crabs beneath the carapaces thereof.

11. In a machine for treating crabs, the combination of a bed, means for advancing crabs along the bed with an intermittent movement, means operating during periods of rest of such movement to cut the legs and claws from opposite sides of the crabs and to break the carapaces thereof, and rotary brushes operating on the trimmed crabs during their movement to remove the broken pieces of shell therefrom.

12. In a machine for treating crabs, the combination of a bed, means for advancing crabs along the bed with an intermittent movement, cutters operable to cut the legs and claws from opposite sides of the crabs when they are at rest at one place during their movement, means for operating the cutters during the periods of rest in the movement of the crabs, and means engaged by each crab as it approaches said place and operable to vary the relative positions of the cutters in response to the sizes of the crabs.

13. In a machine for treating crabs, the combination of a bed, means for advancing crabs along the bed with an intermittent motion, cutters mounted at one of the places at which the crabs come to rest and reciprocable toward and away from the bed to cut the legs and claws from opposite sides of the crabs, means for operating the cutters, and a gauge member engaged by each crab as it approaches the place where it is acted on by the cutters, the member being moved by said crab to vary the relative positions of the cutters in accordance with the size of the crab.

14. In a machine for treating crabs, the combination of a bed, means for advancing crabs along the bed with an intermittent motion, cutters mounted at one of the places at which the crabs come to rest and reciprocable toward and away from the bed to cut the legs and claws from opposite sides of the crabs, means for operating the cutters, guides in which the cutters reciprocate, a gauge member engaged and moved by each crab as it approaches the place where it is acted on by the cutters, the member being connected to the guides and acting to vary their relative positions in accordance with the size of the crab, and means for locking the guides in the positions to which they are moved by the action of the gauge member.

15. In a machine for treating crabs, the combination of a bed, means for advancing crabs along the bed with an intermittent motion, means operating on the successive crabs at one of the places at which they come to rest for cutting the legs and claws from opposite sides of the crabs, means for breaking the carapaces of the crabs, and means for removing the broken pieces of shell and the material within the crabs exposed by removal of said pieces, said removing means including water jets.

STERLING G. HARRIS.
SUMNER C. WILLIS.

REFERENCES CITED

The following references are of record in the file of this patent:

UNITED STATES PATENTS

| Number | Name | Date |
|---|---|---|
| 545,329 | Zucchini | Aug. 27, 1895 |
| 965,706 | Greiner | July 26, 1910 |
| 1,367,546 | Hirth | Feb. 8, 1921 |
| 1,571,169 | Keller | Jan. 26, 1926 |
| 2,299,774 | Weems | Oct. 27, 1942 |